March 10, 1964  S. L. KOUTZ ETAL  3,124,514
CORE REFLECTOR FOR NUCLEAR REACTOR
Filed Aug. 2, 1961  2 Sheets-Sheet 1
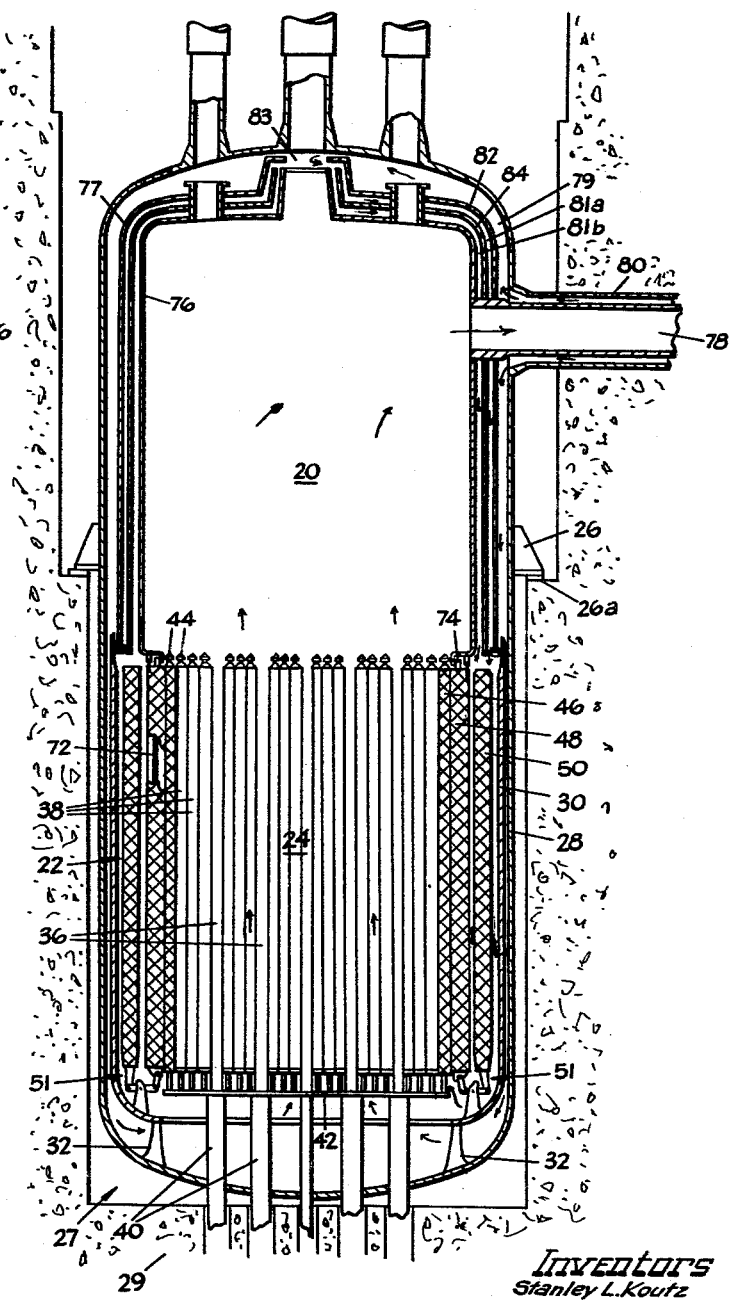
Fig 1
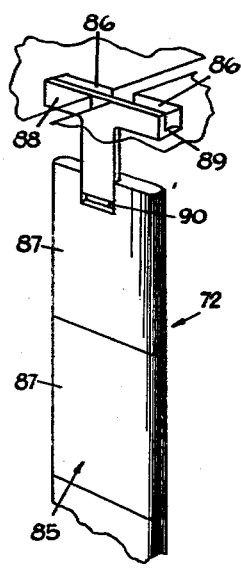
Fig 8
Fig 7
Inventors
Stanley L. Koutz
Wilbert A. Kalk
Frederick B. Nimtz
By
Roland G. Anderson
Atty

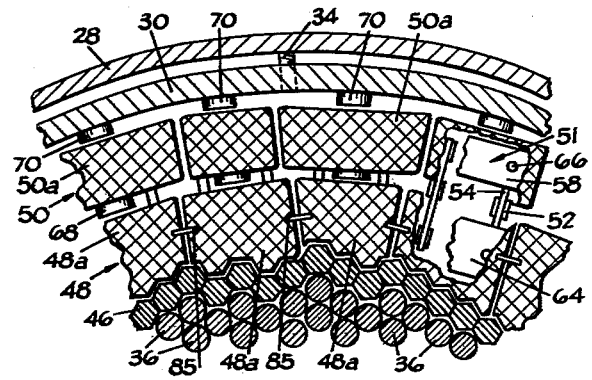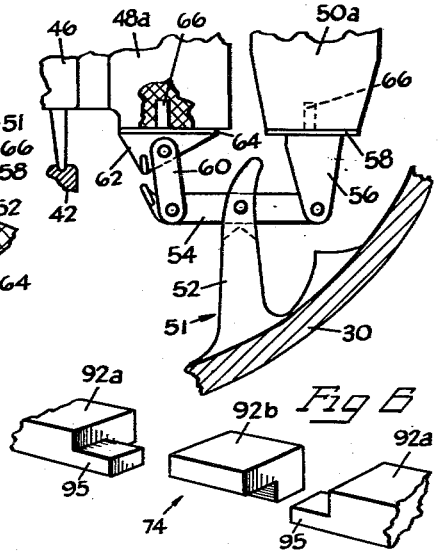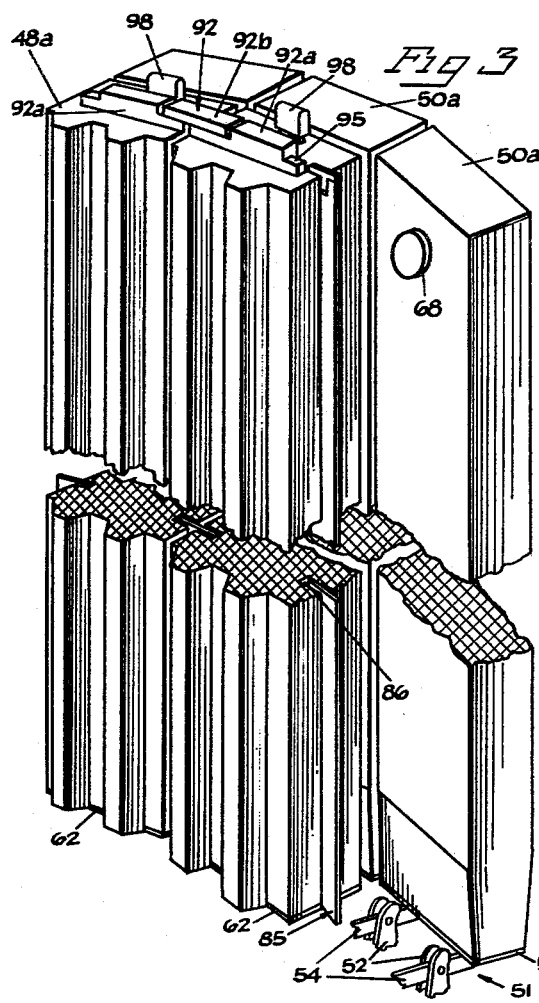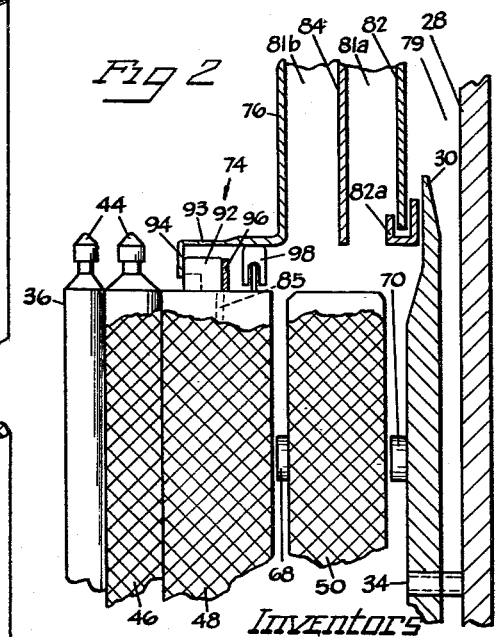
Inventors
Stanley L. Koutz
Wilbert A. Kalk
Frederick B. Nimtz

United States Patent Office 3,124,514
Patented Mar. 10, 1964

3,124,514
CORE REFLECTOR FOR NUCLEAR REACTOR
Stanley L. Koutz, San Diego, Wilbert A. Kalk, Poway, and Frederick B. Nimtz, National City, Calif., assignors, by mesne assignments, to the United States of America as represented by the United States Atomic Energy Commission
Filed Aug. 2, 1961, Ser. No. 128,910
4 Claims. (Cl. 176—58)

The present invention relates generally to nuclear reactors, and is particularly directed to a novel structural arrangement for the core assembly of a gas-cooled nuclear reactor.

The core of a nuclear reactor comprises essentially the fuel elements of fissionable material, control rods of neutron-absorbing material, and means for positioning the fuel elements and control rods and for containing or confining the fissionable material within the core. In a vertically extending reactor, wherein the core is disposed within a pressure vessel or the like, the fuel elements are supported generally by a lower grid or support plate, and means is provided adjacent the upper end of the core, such as an upper grid plate, to support the elements and control rods laterally. Furthermore, the fuel elements and control rods are usually disposed within a surrounding wall of reflector material. However, the previous arrangements for the core assembly of a nuclear reactor have not been entirely satisfactory and, particularly, there has existed certain difficulties in connection with gas-cooled types of reactors. The gas coolant passing through the core flows at a relatively high velocity and, consequently, there are attendant forces on the fuel elements which may cause the elements to chatter and ultimately fracture or wear excessively unless the elements are properly held in position. Then too, it must be recognized that in the event that the elements are too tightly supported, there is difficulty in removing the elements from the core.

It is an object of the present invention to provide an improved structural arrangement for the core assembly of a nuclear reactor. A further object is to provide a novel core arrangement, including a relatively movable neutron reflector about the core, which utilizes a pressure differential across the reflector to tightly hold the elements within the core during operation of the reactor, and to allow removal of the core elements when the reactor is shut down. Still another object of this invention is to provide a novel and highly effective sealing means for such movable reflector, in order to prevent any undesirable exchange of gases within the pressure vessel.

Other objects and advantages of this invention will become apparent from the following description, and the accompanying drawings, wherein:

FIGURE 1 is a longitudinal sectional view of a gas cooled nuclear reactor embodying various features of the present invention;

FIGURE 2 is an enlarged fragmentary view of a portion of the reactor shown in FIG. 1, illustrating in particular the sealing means between the plenum and the upper end of the core reflector;

FIGURE 3 is an enlarged fragmentary perspective view of a portion of the segmented reflector structure shown in FIG. 1;

FIGURE 4 is an enlarged top sectional view taken showing a transverse cross section of the reactor and with parts broken away to show one of the teeter-totter supports for the reflector;

FIGURE 5 is an enlarged fragmentary side view showing the teeter-totter support for a pair of reflector blocks;

FIGURE 6 is an enlarged exploded view of portions of the upper seal blocks on two adjacent reflector blocks;

FIGURE 7 is an enlarged fragmentary top sectional view showing the position of a vertical seal when adjacent reflector blocks become misaligned; and FIGURE 8 is an enlarged fragmentary perspective view of the upper portion of one of the vertical seals.

While the present invention includes features which may be used to advantage elsewhere, it is of particular advantage in a gas cooled nuclear reactor, and it will be described in connection with the illustrated nuclear reactor 20 which is cooled by a gas such as helium. Briefly, in reactor 20 a neutron reflector 22, which surrounds a core or core assembly 24, is segmented and each segment is movably supported. When the reactor is operated the reflector 22 exerts an inward pressure on the core 24 to provide support for the core. This pressure is produced by the resistance to the flow of coolant through the core 24 when the reactor 20 is operating. When the reactor is not operating, the pressure is relieved so that the fuel elements of the core may be removed for repair or for replacement.

Suitable sealing means are provided to control undesired leakage of gas between the blocks or segments of the reflector 22 and between the reflector and various adjacent parts of the reactor. In particular, it is important to control the amount of gas bypassing the core, as this cooler gas, when it mixes with the hotter gas coming from the core, will reduce the temperature of the mixture, thus reducing the efficiency of the unit.

As shown in FIG. 1, the illustrated reactor 20 comprises a generally cylindrical, vertically oriented pressure vessel 28 made from plate steel or the like. The vessel 28 is closed at its upper and lower ends, and is provided with various penetrations to provide access into the vessel. The illustrated pressure vessel 28 is supported within a cavity 27 within an outer shield or housing 29 of a material such as concrete. The vessel 28 is suspended within the cavity 27 by a support ring 26 which rests upon an annular shoulder provided in the inner wall of the housing 29.

Disposed in the lower portion of the pressure vessel 28 is a generally cylindrical, vertically oriented, lower thermal shield 30, which is open at its upper and lower ends and extends from approximately the center of the pressure vessel 28 to a point slightly spaced above the bottom of the vessel. The thermal shield 30, which is constructed of carbon steel or a like material, is supported at its lower end on the bottom of the pressure vessel 28 by circumferentially spaced supports 32. The shield 30 is maintained generally centered within the pressure vessel 28 as by means of pins 34 (FIGS. 2 and 4) which extend outwardly from the shield 30 but are not connected to the vessel wall. The shield 30 is thus allowed to grow upwardly as necessary when it becomes heated by the operation of the rector. Between the shield 30 and the vessel 28 there is formed an annular space which communicates, through the spaces between the supports 32, with the region beneath the core 24.

The generally cylindrical core 24 is located within the thermal shield 30 and is generally the same height as the shield. The core 24 is comprised, essentially, of a number of control rods 36 and a plurality of fuel elements 38, each being generally elongated, cylindrical members disposed in generally side-by-side relation with their axes extending vertically. The control rods 36 are operated by means of suitable control means designated 40 which extend from the bottom of the core 24 down through the thermal shield to a suitable drive means (not shown). The fuel elements rest upon a circular core support or grid plate 42 of carbon steel or the like, which extends horizontally across the reactor slightly above the lower end of the thermal shield 30. The fuel elements 38 are provided with suitable knobs 44 at their upper ends to facilitate their removal from the reactor 20 by suitable fuel handling equipment (not shown).

As shown in FIGS. 1 through 5, surrounding the core 24 and spaced inwardly from the thermal shield 30 is the graphite neutron reflector 22. The reflector 22, which extends generally the height of the fuel elements 38, comprises a plurality of elongated, vertically extending, dummy graphite elements 46 which encircle the core 24, a generally circular, inner graphite reflector ring 48 encasing the dummy elements 46, and a generally circular, outer graphite reflector ring 50 spaced outwardly from the inner ring 48. As seen in FIG. 4, the dummy elements 46 are of hexagon cross section and form a generally continuous ring around the periphery of the bundle of fuel elements 38 of the core. The elements 46 are provided with knobs 44 so that they may be removed by the fuel handling equipment. The inner surfaces of the inner reflector 48 is machined to mate with the hexagonal dummy elements 46.

The ring reflectors 48 and 50, seen best in FIGS. 3 and 4, are circumferentially segmented, whereby each ring is comprised of a plurality of elongated, vertically extending blocks or segments designated 48a and 50a, respectively. Alternate blocks 48a and 50a are formed with inwardly tapered planform to provide the generally circular configuration of the reflectors 48 and 50. Each of the blocks 48a of the inner reflector 48 is in general radial alignment with a block 50a of the outer reflector 50; however, the blocks 50a and 48a are so constructed that no direct radial path for the gas is provided through both rings.

Each of the inner reflector blocks 48a is supported on the inner end of a teeter-totter mechanism 51, while the aligned outer reflector block 50a is supported at the outer end of the mechanism. Thus, the weight of each outer block 50a serves to support and urge upwardly the aligned inner block 48a. Specifically, as shown best in FIGS. 4 and 5, an upwardly extending, forked support or bracket 52 is fixed to the lower edge of the thermal shield 30 below each aligned pair of reflector blocks 48a and 50a. Pivotally connected intermediate its ends between the forks of the support 52 is a short pivot link 54. Pivotally connected to the outer end of the link 54 is a bracket 56 which is fixed to the underside of a generally horizontal support plate 58 for the outer reflector block 50a. The inner end of the link 54 is preferably pivotally connected to a connector link 60 which is in turn pivotally connected to a bracket 62 fixed to the underside of a support plate 64 for the inner reflector block 48a. The blocks 48a and 50a may be removably supported upon the respective support plates 64 and 58 as by means of a cavity in the undersurface of each block which receives a pin 66 fixed to and extending upwardly from the respective support plate.

Suitable pressure-transfer buttons or projections 68 are fixed to the inner wall of each of the outer reflector blocks 50a near its upper end. Similar buttons 70 are fixed to the inner wall of the thermal shield 30 outwardly of each outer block 50. Preferably, these pressure-transfer buttons 68 and 70 are in general radial alignment, as shown in FIGS. 2 and 4, to insure proper spacing of the reflector blocks.

When the reactor 20 is being operated, the inside of the inner reflector ring 48 is raised to a substantially higher temperature than the outside, particularly at the upper end of the ring 48, and this thermal gradient or variation in temperature across the ring 48 tends to cause its thermal expansion particularly at the upper end thereof. The upper ends of the reflector blocks 48a and 50a are free to move radially under this expansion force due to the pivotal connections at their lower ends. As will be explained more fully below, the lower ends of the inner blocks 48a also are radially movable to allow the blocks 48a to move without substantial tilting from the vertical. The inward movement of the reflector is caused by the differential pressure across the reflector and serves to hold the core 24 tightly in place as long as the reactor 20 is being operated. When the reactor 20 is not being operated, the pressure variation across the inner blocks 48a is removed, making it possible to remove the fuel elements 38.

The inner reflector ring 48 is provided with vertical sealing means 72 extending lengthwise between each pair of adjacent blocks 48a. Upper sealing means 74 are also provided at the upper end of the inner reflector ring 48 to restrict the passage of gas outwardly and over the top of the reflector 22. These sealing means 72 and 74 will be described in detail after the flow of gas within the reactor has been described so that their function may be more readily understood.

Located in the upper portion of the pressure vessel 28 as shown in FIG. 1, is a generally cylindrical upper plenum shroud 76. The lower edge of this plenum shroud is formed with an inwardly and downwardly turned edge which cooperates with the upper seal means 74 on the inner reflector 48 to define a substantially enclosed chamber 77 for receiving the heated gases 21 emerging from the core 24. The plenum shroud 76 is spaced inwardly from the pressure vessel 28, defining a space therebetween. An outlet conduit 78 leads from the chamber 77 defined by the shroud 76, and an inlet conduit 80, which is concentrically disposed about the outlet conduit, leads into the space between the vessel 28 and the shroud 76. Specifically, the outlet conduit 78 is fixed to the wall of the shroud 76 and passes within the inlet conduit 80 which is fixed to the vessel 28, both conduits passing out through the concrete shield 29. A pair of spaced-apart upper thermal shields i.e., outer shield 82 and inner shield 84, are disposed between the plenum shroud 76 and the pressure vessel 28, so as to define three space-layers between the shroud 76 and the pressure vessel 28, namely an outer layer 79 and two inner layers 81a and 81b. These three layers 79, 81a and 81b are separated from one another except at the top center of the reactor where the upper thermal shields 82 and 84 are provided with openings 83 allowing all three layers to communicate with one another, and except at the lower edge of the outer shield 84 where the separation between the two inner layers 81a and 81b thus ends. As shown in FIG. 2, the lower edge of the outer shield 82 is provided with an annular sealing ring 82a which serves to substantially connect upper shield 82 to lower thermal shield 30 so that the outer layer 79 is in communication with the space between the lower shield 30 and the wall of the pressure vessel 28, and the inner layers 81a and 81b are in communication with the space between the reflector rings 48 and 50 and the space between the outer reflector ring 50 and the lower thermal shield 30.

As to the operation of the reactor 20, the coolant gas enters the reactor through the inlet conduit 80, with about half of the gas moving upwardly in the outer layer 79 and the remainder of the gas moving downwardly in that layer. The gas which moves downwardly passes directly down between the lower thermal shield 30 and the pressure vessel 28. The gas which has passed upwardly flows into the two inner layers 81a and 81b, through openings 83, and then flows downwardly through these inner layers and through the spaces on either side of the outer reflector 50, i.e., the space between the outer reflector 50 and the lower thermal shield 30 and the space between the inner and outer reflectors 48 and 50. This flow and the flow passing directly downwardly between the lower thermal shield 30 and the pressure vessel 28 then pass upwardly past the grid plate 42 into the core 24. The coolant gas passes upwardly through the core 24 at a high velocity, being heated by the reactions taking place within the core, so that it emerges from the core 24 into the chamber 77 in a highly heated condition. From this chamber 77 the gas leaves the reactor 20 through the outlet conduit 78. The heat from the gas is liberated and the coolant may then be recycled back to the reactor.

It may be seen that to achieve fullest efficiency from the reactor 20, the gas should pass up through the full length of the core 24 and directly out the outlet conduit 78. In this regard, means are provided in the illustrated reactor 20 to prevent leakage between various parts: between the lower edge of the plenum shroud 76 and the inner reflector ring 48, between the blocks 48a of the inner reflector ring 48, and between the dummy reflector elements 46 and the inner reflector ring 48.

As seen best in FIGS. 3, 4, 7 and 8, each vertical sealing means 72, which prevents leakage between adjacent inner blocks 48a, comprises an elongated seal strip or member 85 which is received in aligned, vertical seal grooves or slots 86 in the sides of adjoining blocks 48a. Each of the illustrated strips 85 is comprised of a stack of graphite body segments 87 and a T-shaped top segment 88, each segment having a backing or reinforcing plate of metal secured to its outer surface (FIG. 8). The strip 85 is supported by resting upon the support block 64 of the inner reflector block 48a. As shown in FIG. 8, the T-shaped top segment 88 is supported upon ledges 89 formed in the seal grooves 86 and extends downwardly into a center slot 90 in the uppermost body segment 87 to allow for relative vertical expansion between the seal strip 85 and the blocks 48a, without disrupting the sealing action therebetween. As shown in FIG. 7, the grooves 86 in the blocks 48a are thicker then the seal strips 85 to permit a certain amount of radial misalignment or relative movement between adjacent blocks 48a without breaking the seal strip 85 or impairing the seal.

The upper seal means 74, which prevents the coolant gas from bypassing the core 24 at the upper end of the reflector 22 and confines the heated gas within the plenum 76, comprises generally a segmented ring 92 of graphite having a generally square cross section and disposed around the top of the inner reflector ring 48 in the position shown in FIGS. 2 and 3. This seal ring 92 cooperates with the lower end of the plenum shroud 76 to provide a seal between the hot gas chamber 77 and the area through which flows the incoming coolant gas. As seen in FIG. 2, the lower edge of the plenum shroud 76 has an inwardly extending flange 93 which is itself turned downwardly along its inner edge to provide a downwardly extending vertical lip 94. When the reactor 20 is in operation, the pressure causes the inner reflector ring 48 to be urged inwardly, and the upper seal ring 92 to engage the outer surface of lip 94 to provide a seal therebetween.

The specific construction of the segmented seal ring 92 may be best seen from FIGS. 3 and 6, FIG. 6 showing the blocks or segments 92a and 92b making up the ring in exploded relation to one another, while FIG. 3 shows the segments assembled into the ring 92. One segment 92a of the ring 92 is loosely seated on the upper surface of each of the inner reflector blocks 48a. Both ends of each fixed segment 92 are formed with a tab 95 in the inner lower quadrant which mates with an L-shaped intermediate segment 92b. When the segments 92a and 92b are assembled as shown in FIG. 3, with an intermediate segment 92b serving to close any gap between adjacent fixed segments 92a, a circular metal retaining ring 96 (FIG. 2) is disposed around the outside of the seal and serves to hold the segments 92b in place.

To maintain the upper surfaces of the inner reflector blocks 48a at the same level so as not to disturb the seal provided by the upper seal means 74, the inner blocks 48a are urged upwardly toward the horizontal flange 93 of the plenum shroud 76 by the respective outer blocks 50a, as described above. To prevent this upward urging from creating friction forces sufficient to retard the radial movement of the inner reflector blocks 48a, each of these blocks 48a is provided at its upper end with a low friction rocker 98.

The non-tilting feature of the reflector 22 also serves to maintain the upper seal provided by the upper seal means 74 in tact during the operation of the reactor. As noted above, the lower portions of the inner reflector blocks 48a move inwardly when the upper ends of the blocks 48a are moved inwardly, thereby preventing tilting of the blocks 48a which would disturb the upper seal. In addition to maintaining the upper seal, this feature prevents the creation of a bypass route between the inner blocks 48a and the dummy elements 46 through which upwardly flowing gas could bypass the lower portion of the core 24.

Thus, a neutron reflector structure is provided which will tightly hold the bundle of fuel elements of the core during the operation of the reactor, and will also relax its hold incident to the cooling of the reactor (when it is not being used) to enable the fuel elements to be removed. In addition, the action of the structure cooperates with the seal means provided to minimize loss of efficiency through bypassing of the core by the coolant gas.

Various modificaitons and changes may be made in the illustrated structure without departing from the spirit and scope of the invention. Various features of the invention are set forth in the following claims.

What is claimed is:

1. A gas cooled nuclear reactor including a vertically disposed pressure vessel, a reactor core assembly within the lower portion of said vessel comprising a plurality of elongated, vertically disposed fuel elements, and a side reflector surrounding said core assembly for substantially its entire height, said reflector comprising a ring of reflector material, said ring being formed of a plurality of blocks of reflector material disposed in side-by-side relation circumferentially of said core assembly, and means supporting each of said blocks comprising a link pivotally interconnecting the lower end of said block to said vessel, said reactor also including a plenum shroud disposed in the upper portion of said vessel in inwardly spaced relation to the wall thereof and forming a substantial seal at its lower edge with the upper edge of said reflector ring to define a chamber located above said core assembly for heated gases emerging from said core assembly, an outlet conduit connected to said plenum shroud to provide an outlet for the gases from said chamber, and an inlet conduit connected to said pressure vessel to provide an inlet for coolant gases into the vessel outwardly of said plenum shroud and said reflector ring.

2. A gas cooled nuclear reactor including a vertically disposed pressure vessel, a reactor core assembly within said vessel comprising a plurality of fuel elements, a side reflector surrounding said core assembly and comprising a pair of concentric rings of reflector material, each of said rings being formed of a plurality of blocks of reflector material disposed in side-by-side sealed relation circumferentially of said core assembly with each block of the inner of said rings being generally radially aligned with a block of the outer ring, and means supporting each pair of said generally radially aligned blocks comprising a link pivotally interconnecting the lower ends of said pair of blocks, and a support carried by said vessel and pivotally connected to an intermediate portion of said link, whereby relative vertical movement is afforded between said pair of blocks.

3. A gas cooled nuclear reactor including a vertically disposed pressure vessel, a reactor core assembly disposed in the lower portion of said pressure vessel comprising a plurality of elongated vertically disposed fuel elements, a side reflector surrounding said core assembly for substantially its entire length, said reflector comprising a plurality of elongated, vertically disposed dummy elements adjacent said fuel elements, an inner ring adjacent said dummy elements, and an outer ring adjacent said inner ring, said rings each being formed of a plurality of circumferential segments of reflector material disposed in side-by-side relation around said core assembly, each segment of said inner ring being in general alignment with a segment of said outer ring, a teeter-totter support for each aligned pair of segments, each of said teeter-totter supports comprising a bracket supported in said pressure vessel below said reflector, a pivot arm pivotally mounted in said bracket, one end of said pivot arm being pivotally connected to the lower end of said aligned outer segment, a connecting link pivotally interconnected between the other end of said pivot arm and the lower end of said aligned inner segment, whereby inward pressure on the upper end of said inner segment will serve to move the segment inwardly without any substantial tilting of said inner segment, a plenum shroud in the upper portion of said pressure vessel, said shroud being spaced inwardly from said vessel and extending downwardly to meet the upper edge of said inner reflection ring and form a substantial seal therewith so as to define a heated gas chamber above said core assembly, an outlet conduit connected to said plenum shroud forming an outlet from said chamber for the heated gases, and an inlet conduit connected to said pressure vessel forming an inlet for cooler gases into said vessel outwardly of said plenum shroud and of said inner reflector ring, whereby, when the reactor is operated, the pressure differential created by the temperature gradient across said inner ring serves to hold the core assembly.

4. A gas cooled nuclear reactor including a vertically disposed pressure vessel, a reactor core assembly disposed in the lower portion of said pressure vessel comprising a plurality of elongated vertically disposed fuel elements, a side reflector surrounding said core assembly for substantially its entire length, said reflector comprising a plurality of elongated, vertically disposed dummy elements adjacent said fuel elements, an inner ring adjacent said dummy elements, and an outer ring adjacent said inner ring, said rings each being formed of a plurality of circumferential segments of reflector material disposed in side-by-side relation around said core assembly, each segment of said inner ring being in general alignment with a segment of said outer ring, vertical sealing means disposed between each adjoining pair of inner ring segments and extending substantially the height of said inner ring, a teeter-totter support for each aligned pair of segments, each of said teeter-totter supports comprising a bracket supported in said pressure vessel below said reflector, a pivot arm pivotally mounted in said bracket, one end of said pivot arm being pivotally connected to the lower end of said aligned outer segment, a connecting link pivotally interconnected between the other end of said pivot arm and the lower end of said aligned inner segment, whereby inward pressure on the upper end of said inner segment will serve to move the segment inwardly without any substantial tilting of said inner segment, a plenum shroud in the upper portion of said pressure vessel, said shroud being spaced inwardly from said vessel and extending downwardly to a point adjacent the upper edge of said inner reflection ring, upper sealing means between said plenum shroud and said inner reflector ring providing a substantial seal therebetween so as to define a heated gas chamber above said core assembly, an outlet conduit connected to said plenum shroud forming an outlet from said chamber for the heated gases, and an inlet conduit connected to said pressure vessel forming an inlet for cooler gases into said vessel outwardly of said plenum shroud and of said inner reflector ring, whereby, when the reactor is operated, the pressure differential created by the resistance to the flow of coolant through the core serves to hold the core assembly.

References Cited in the file of this patent

UNITED STATES PATENTS

| | | |
|---|---|---|
| 2,107,691 | Corser | Feb. 8, 1938 |
| 2,970,097 | Correc | Jan. 31, 1961 |
| 2,998,370 | Gount et al. | Aug. 29, 1961 |

FOREIGN PATENTS

| | | |
|---|---|---|
| 222,480 | Australia | Oct. 10, 1957 |
| 855,358 | Great Britain | Nov. 30, 1960 |
| 1,100,829 | Germany | Mar. 2, 1961 |